Figure 1:
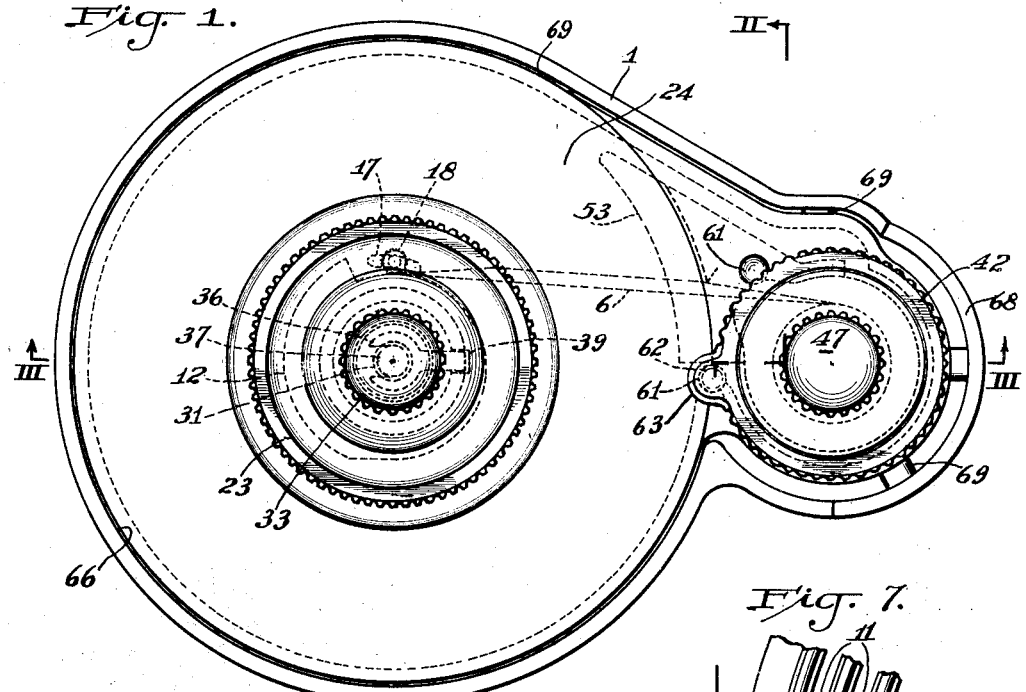

April 21, 1942.  L. D. ANDREWS  2,280,113
DEVELOPING APPARATUS
Filed May 6, 1940      2 Sheets-Sheet 1

WITNESSES.
A. B. Wallace.
V. A. Peckham.

INVENTOR.
Lewis D. Andrews
BY Brown, Critchlow & Flick
his ATTORNEYS.

April 21, 1942. L. D. ANDREWS 2,280,113
DEVELOPING APPARATUS
Filed May 6, 1940 2 Sheets-Sheet 2
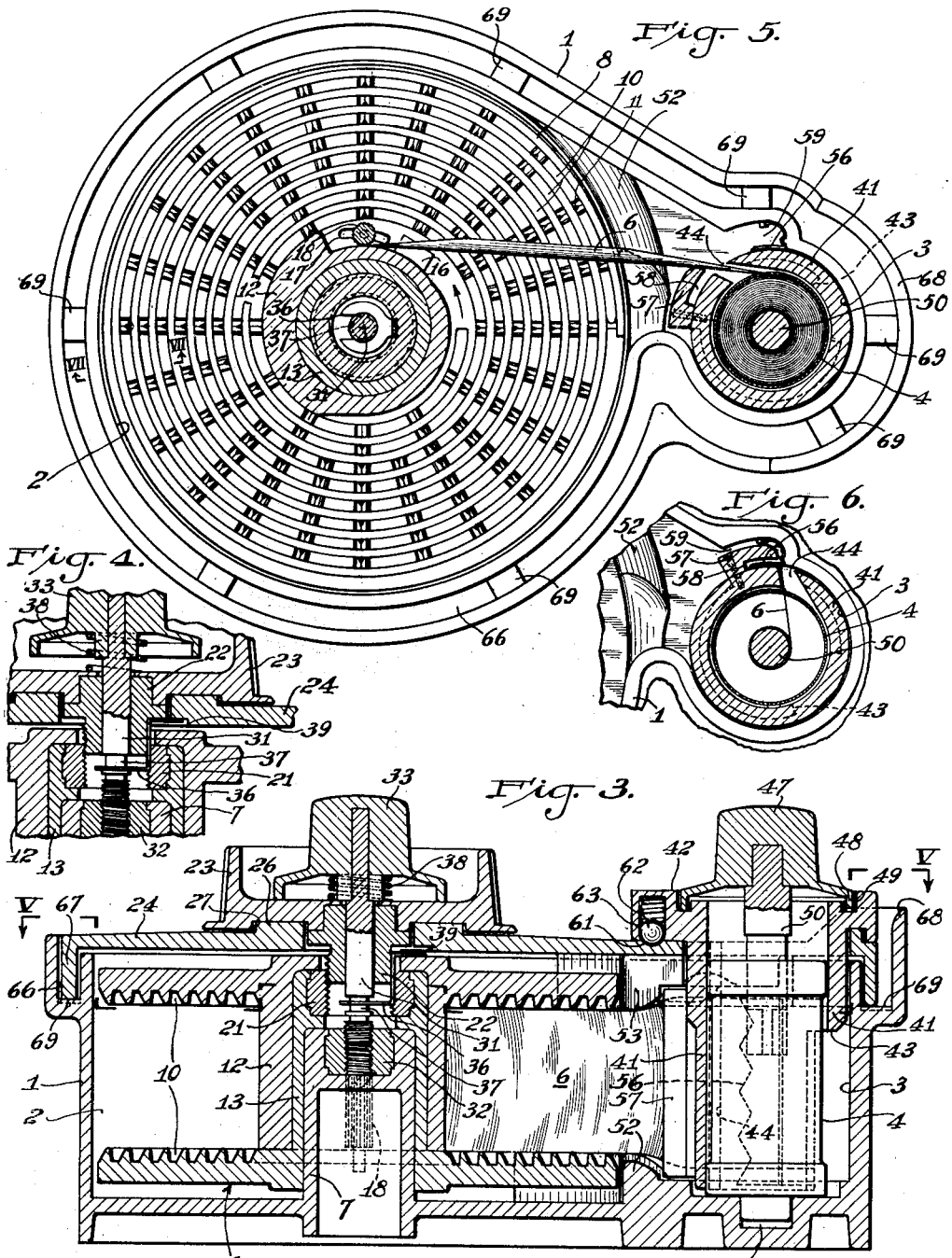
WITNESSES.
INVENTOR.
Lewis D. Andrews
BY
his ATTORNEYS.

Patented Apr. 21, 1942

2,280,113

UNITED STATES PATENT OFFICE 2,280,113

DEVELOPING APPARATUS

Lewis D. Andrews, St. Marys, Pa., assignor to Stackpole Carbon Company, St. Marys, Pa., a corporation of Pennsylvania Application May 6, 1940, Serial No. 333,467

12 Claims. (Cl. 95—90.5)

This invention relates to apparatus for developing strips of photographic film, such as candid camera film and the like, and is especially applicable to a daylight loading developer.

It is among the objects of this invention to provide developing apparatus which is simple and inexpensive in construction, which can be quickly and easily loaded and operated in daylight, in which the cover is detachably locked to the tank, from which liquids can be poured satisfactorily, and which permits a film to be severed from its cartridge and liquids to be poured into and out of the tank without admitting light to the tank.

In accordance with this invention a tank is formed for receiving and rotatably supporting a film cartridge and a film-receiving reel spaced laterally therefrom. Manually operable rotatable means is mounted in the tank for severing the film from the cartridge after the major portion of it has been wound on the reel. This is done by means of a severing member mounted in the tank and a rotatable member for bringing the film and severing member into cutting engagement with each other. The severing member is preferably a rigidly mounted blade, and the rotatable member a bushing-like housing formed for receiving the film cartridge and provided with a slot in its side wall through which the film is drawn to the reel. When this housing is turned it forces the film against the blade. Light is prevented from entering the tank by means of a removable cover through which the cartridge housing extends, and by a removable closure for the upper end of the housing. After the housing has been turned to cut the film from the cartridge the side wall of the tank covers the film slot in the housing so that light can not enter the tank through the slot when the empty cartridge is removed. The developing solution is introduced through the housing, the lower portion of which is formed for admitting fluid into the tank without allowing light to strike the film.

The flanges of the reel are provided with spiral grooves into which the film is led in the usual manner by first bowing it transversely. This bowing is accomplished by means of a pair of oppositely disposed integral ribs on the cover and bottom of the tank between which the film must pass. The reel is turned by means of an operating knob that overlies and extends through the cover to the reel to which it is connected. The knob and reel have an axial passage therethrough in which a bolt-like member may be inserted and its inner end screwed into the tank to lock the cover on the tank. Means is also provided for locking the reel against rotation relative to the cover when the cover is removed from the tank.

Figure 7:
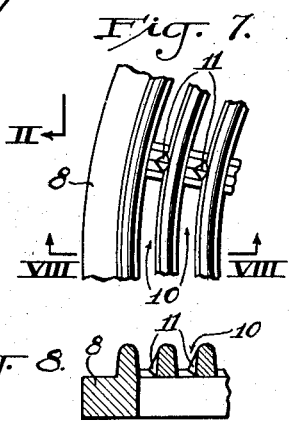
Figure 2:
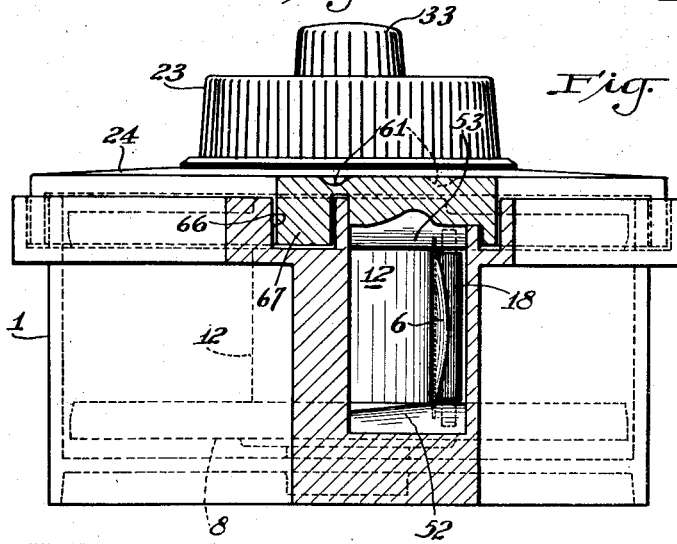
Figure 8:
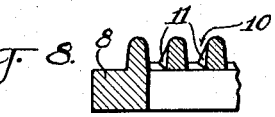

The preferred embodiment of the invention is illustrated in the accompanying drawings in which Fig. 1 is a plan view of my developing apparatus; Figs. 2 and 3 are vertical sections thereof taken on the lines II—II and III—III, respectively of Fig. 1; Fig. 4 is a fragmentary view showing the cover locking means in unlocked position; Fig. 5 is a horizontal section taken on the line V—V of Fig. 3; Fig. 6 is a fragmentary view showing the film cut-off in cutting position; Fig. 7 is an enlarged fragmentary view of the lower flange of the reel; and Fig. 8 is a vertical section taken on the line VIII—VIII of Fig. 7.

Referring to Figs. 3 and 5 of the drawings, part of the side wall of the tank 1 forms a wall for the major portion of a circular area 2 in which exposed film is developed, as will be described presently. The side wall of the tank at its opposite end forms a wall for the major portion of a smaller circular area 3 adapted to receive a cartridge 4 containing a roll of undeveloped film 6. The bottom of the tank at the center of the developing area is provided with a high cylindrical boss 7 which projects up into a cylindrical opening in the center of a film-developing reel 8 removably disposed in the tank. This boss not only positions the reel in the tank, but also serves as a bearing for it.

The inner face of each flange of the reel is provided with a spiral groove 10 for receiving the edge portions of the film in a well-known manner. The film is held out of engagement with the inner side of the groove by bosses 11 therein (Figs. 7 and 8) so that the edge of the film will be developed along with its body. Each boss presents only an inclined edge to the film and therefore has only a point contact with the film. The reel is made in two parts which are then connected together at their hubs. For this purpose the center of each flange is provided with an inwardly extending cylindrical hub, the upper one 12 being hollow for telescopically receiving the lower one 13. To assure the ends of the spiral grooves in the two flanges being opposite each other when the reel is assembled, the lower end of the upper hub is provided with a notch that fits over an integral key 16 on the lower hub.

The upper and lower flanges are provided beside the hub with a pair of oppositely disposed slots 17 for receiving the ends of a knurled roller 18. When the reel is in initial film-receiving position, as shown in Fig. 5, the ends of the slots nearest the film cartridge slant in toward the reel hub. Thus, when the leading end of the film is inserted between the roller and hub, and the roller is moved in the slots toward the hub, it engages the film and presses it tightly against the hub. The roller's grip on the film is increased as the film is pulled.

To lock the two parts of the reel together and also provide means for turning it, the top of the lower hub is provided with an interiorly threaded bushing 21 adapted to threadedly receive a cooperating threaded bushing 22 on the bottom of a knob 23, as shown in Fig. 3. This knob overlaps a portion of the tank cover 24 through which bushing 22 extends. Preferably, the cover opening is encircled by a rib 26 that projects into an annular recess 27 in the bottom of the knob so that light can not enter the tank through the cover opening.

To make it possible to lock the cover on the tank, in order that an undeveloped film can not fall out in case the tank is accidentally upset, the turning knob and its bushing are provided with an axial passage in which a pin 31 may be disposed. The lower end of the pin is threaded so as to screw into a threaded bushing 32 in the top of tank boss 7 that supports the reel. Rigidly mounted on the outer end of this pin is a knob 33 by which it may be screwed into place and which is disposed in the hollow upper portion of the reel-turning knob.

To facilitate attaching the leading end of the film to the reel hub it is desirable that the reel be held against rotation during this operation with the film-gripping roller 18 in the position shown in Fig. 5. Accordingly, hub bushing 21 is provided in its inner surface with a vertical slot in which a key 36 is slidably mounted. The upper end of this key extends laterally over the reel for a short distance, and the lower end is bent inwardly and forked (Fig. 5) so as to straddle a reduced portion 37 of locking pin 31. When the cover is locked on the tank by pin 31, as in Fig. 3, key 36 performs no function, but when the lower end of pin 31 is unscrewed from hub bushing 32 a coil spring 38 encircling pin 31 and compressed between knobs 33 and 23 raises the pin relative to knob 23. As shown in Fig. 4, this causes the shoulder at the bottom of reduced portion 37 to lift the key so that its upper end will project into a slot 39 in the bottom of the cover when the reel is rotated to a predetermined position in which the key and slot register, whereby the key then prevents the reel from rotating relative to the cover until knob 33 is again depressed. No claim is made by me to this feature in this application.

Another feature of this invention is that the portion of the cover over the cartridge-receiving area 3 of the tank is provided with a circular opening in which a hollow cylindrical housing 41 is rotatably mounted. This housing is provided at its upper end with a peripheral flange 42 that rests on the cover in light-trapping relation. The lower portion of the housing is decreased in diameter to provide between it and the side wall of the tank a space with which the interior of the housing communicates through a relatively large opening 43 for a purpose described hereinafter. The housing is adapted to rotatably receive a film cartridge 4, and therefore is provided in its side wall with a vertical slot 44 (Fig. 5) through which the film is drawn from the usual slot in the side of the cartridge. The bottom hub of the cartridge is rotatably mounted in a circular recess 46 in the bottom of the tank, as shown in Fig. 3.

During the winding of the film from the cartridge to the reel the top of housing 41 is closed by a rotatable knob 47 having a depending peripheral flange 48 projecting into an annular recess 49 in the top of the housing to prevent light from entering the latter. This knob has a depending split stem 50 that projects into the central opening of the film cartridge and frictionally or mechanically grips it, depending upon the type of cartridge used.

In order to decrease the width of the film so that it can enter the reel between its flanges, the tank and cover are provided with a pair of oppositely disposed integral ribs 52 and 53, respectively, that extend transversely of the film between the cartridge and reel for bowing the film transversely. As shown in Fig. 3, the sides of the ribs next to the cartridge are preferably inclined toward each other and the reel so as to provide a relatively narrow throat through which the film can not pass without bowing. As shown in Fig. 2, the inner end portion of the lower rib's upper surface slants downwardly toward its end. This inclined surface tends to cause the edge of the film to slip toward the adjacent end of the rib and thereby compel it to bow in the opposite direction, which is necessary.

A major feature of this invention is that the rear end of the film may be positively severed from the cartridge after it has been unwound therefrom. Accordingly, a vertical serrated blade 56 is rigidly mounted in the tank at one side of slot 44 in the cartridge housing so that when the housing is turned by its knurled flange 42 it will force the film against the blade and thereby cut it in two close to its rear end. To aid in supporting the film during the cutting operation, housing 41 is provided exteriorly of slot 44 on the side opposite the blade with an elongate vertical member 57 provided with a blade-receiving recess 58. The side wall of the tank is provided with an offset portion 59 for receiving this blade-receiving member when the cartridge housing is turned to film cut-off position, as shown in Fig. 6. When in this position, housing slot 44 is closed by the side of the tank, and light is further prevented from entering the tank through this slot by the blade which is then disposed in the blade-receiving member and thereby helps form a light trap. To hold the cartridge housing in either of its two positions, i. e., operative or cut-off, its flange 42 is provided with a radially projecting boss 63 (Fig. 1) having a downwardly facing opening in which a spring pressed ball 62 is slidably disposed. This ball is adapted to project into either one of two circumferentially spaced depressions 61 in the tank cover.

When the cartridge housing is in film cut-off position knob 47 that closes it may be removed to permit removal of the empty cartridge without light being able to enter the tank through the cartridge. Developing solution is then supplied to the tank by pouring it in through empty housing 41 from which it escapes into the tank through opening 43 which is in the side of the housing farthest from the reel. The film can be agitated in the developing solution by merely turning the reel. The developer is removed from the tank by merely pouring it out of the cartridge housing. However, when the tank is tilted for this purpose some of the developer will leak out around the cover. To take care of this leakage the top of the entire tank is surrounded by a deep channel 66 into which cover flange 67 extends, and the outer wall of the channel is elevated at the pouring end of the tank to provide a pouring spout 68. This spout pours a stream of developer from channel 66 into the stream issuing from the cartridge housing, whereby only one stream leaves the tank as a whole. Filling and emptying the tank can be speeded up by providing the bottom of channel 66 with bosses 69 that space the bottom of the cover flange from the tank. This space forms an air vent while the tank is being filled, and an outlet when it is being emptied. The washing water is introduced into the tank and removed therefrom in the same manner as the developer.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A film developer comprising a tank, a film-cartridge receiving member rotatably mounted within the tank and having an open end for receiving a film-cartridge and provided in its side wall with a film receiving slot, a reel rotatably mounted in the tank for receiving film from said slot, a cutting blade mounted in the tank adjacent said slot for cutting the film from the cartridge when said member is rotated to press the film against the blade, and a cover for said open end of said cartridge receiving member, said blade and member cooperating to form a light trap to prevent light from passing through said slot when the film is cut and said cover removed.

2. A film developer comprising a tank, a film-cartridge receiving member rotatably mounted within the tank and having an open end for receiving a film-cartridge and provided in its side wall with a film-receiving slot, a reel rotatably mounted in the tank for receiving film from said slot, a cover for the tank provided with an opening in which the upper portion of said member is permanently mounted, means connecting said reel to the cover, a cutting blade mounted in the tank adjacent said slot for cutting the film from the cartridge when said member is rotated to press the film against the blade, and a cover for said open end of said cartridge receiving member, said blade and member cooperating to form a light trap to prevent light from passing through said slot when the film is cut and said last-mentioned cover removed.

3. A film developer comprising a tank, a film-cartridge receiving cylindrical member rotatably mounted within the tank and provided in its side wall with a film receiving slot, a reel rotatably mounted in the tank for receiving film from said slot, a cutting blade mounted in the tank adjacent said slot for cutting the film from the cartridge when said member is rotated to press the film against the blade, a cover for the tank provided with an opening receiving said cylindrical member and having a pair of circumferentially spaced recesses adjacent said opening, the upper end of said member being provided with a flange overlying the cover, and spring pressed means carried by said flange and adapted to project into said recesses for holding said member in predetermined positions.

4. A film developer comprising a tank provided with a cylindrical boss on its bottom, a film receiving reel having a hollow hub rotatably mounted on said boss, a cover for the tank provided with an opening above said hub, a turning knob overlying the cover and having an extension projecting through said cover opening and connected to said hub, said knob and extension being provided with an axial opening therethrough, and a locking member overlying said knob and extending down through said axial opening into detachable engagement with said boss for locking the cover on the tank.

5. A film developer comprising a tank provided with a cylindrical boss on its bottom, a two-part film-receiving reel having a hollow lower hub rotatably mounted on said boss and a hollow upper hub removably telescoped over the lower hub, a cover for the tank provided with an opening above said hubs, a turning knob overlying the cover and having an extension projecting through said cover opening and into said upper hub where it detachably engages said lower hub for locking the two hubs together, said knob and extension being provided with an axial opening therethrough, and a locking member overlying said knob and extending down through said axial opening into detachable engagement with said boss for locking the cover on the tank.

6. A film developer comprising a tank adapted to rotatably support a film-cartridge, a reel rotatably mounted in the tank and provided with opposed spiral grooves for receiving the opposite edges of a film from the cartridge, and a cover for the tank, the inner surfaces of the tank cover and bottom being provided with a pair of oppositely disposed ribs between the cartridge and reel for bowing the film transversely to permit it to enter said reel grooves, the bottom rib extending transversely of the film and having its film engaging surface inclined downwardly toward a line intersecting the axes of the cartridge and reel.

7. A film developer comprising a tank adapted to rotatably support a film-cartridge, a reel rotatably mounted in the tank and provided with opposed spiral grooves for receiving the opposite edges of a film from the cartridge, and a cover for the tank, the inner surfaces of the tank cover and bottom being provided with a pair of oppositely disposed ribs between the cartridge and reel for bowing the film transversely to permit it to enter said reel grooves, the film engaging surface of the upper rib extending obliquely across the film with its outer end toward the cartridge.

8. A film developer comprising a tank adapted to rotatably support a film-cartridge, a reel rotatably mounted in the tank for receiving film from the cartridge, means mounted in the tank for severing the film from the cartridge, and a cover for the tank, the inner surfaces of the tank cover and bottom being provided with a pair of oppositely disposed raised portions between the cartridge and reel for bowing the film transversely to permit it to enter the reel.

9. A film developer comprising a tank adapted to rotatably support a film-cartridge, a reel rotatably mounted in the tank for receiving film from the cartridge, means mounted in the tank for severing the film from the cartridge, and a cover for the tank, the inner surfaces of the tank cover and bottom being provided with a pair of oppositely disposed ribs extending transversely of the film between the cartridge and reel for bowing the film transversely to permit it to enter the reel, the ribs having film engaging surfaces converging toward the reel.

10. A film developer comprising a tank, a film-cartridge receiving member rotatably mounted within the tank and provided in its side wall with a film receiving slot, a rotatable cover mounted on said member and adapted to be detachably connected to the upper end of a film cartridge disposed therein, a reel rotatably mounted in the tank for receiving film from said slot, and a cutting blade mounted in the tank adjacent said slot for cutting the film from the cartridge when said member is rotated to press the film against the blade.

11. A film developer comprising a tank, a film-cartridge receiving member rotatably mounted within the tank and provided in its side wall with a film receiving slot, a reel rotatably mounted in the tank for receiving film from said slot, a cutting blade mounted in the tank adjacent said slot, and an elongate member connected to the outside of said rotatable member adjacent its slot on the side opposite said blade, said elongate member being provided with a blade-receiving recess.

12. A film developer comprising a tank, a film-cartridge receiving member rotatably mounted within the tank and provided in its side wall with a film receiving slot, a reel rotatably mounted in the tank for receiving film from said slot, and a film-severing member mounted in the tank adjacent said slot for cutting the film from the cartridge when said member is rotated to press the film against said severing member.

LEWIS D. ANDREWS.